Jan. 5, 1932.　　　K. L. RICK　　　1,839,594
BRACKET
Filed June 29, 1928
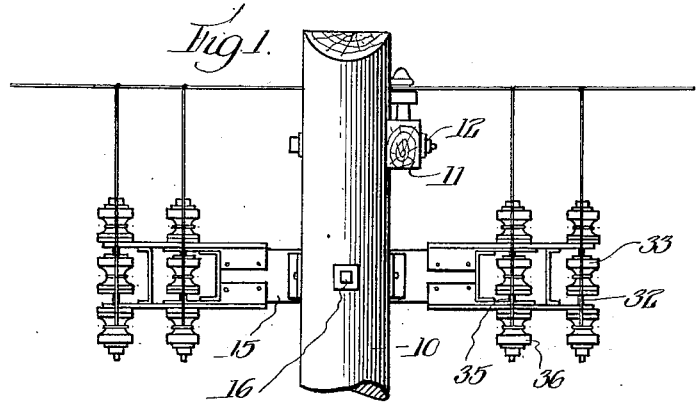
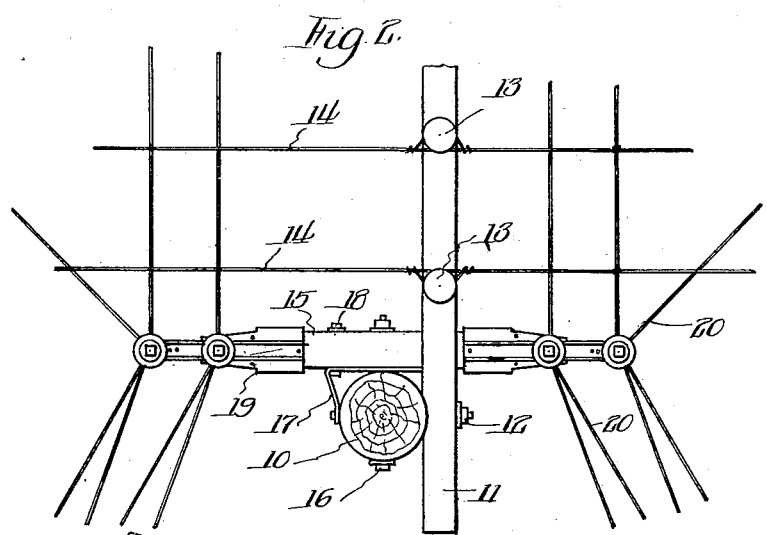
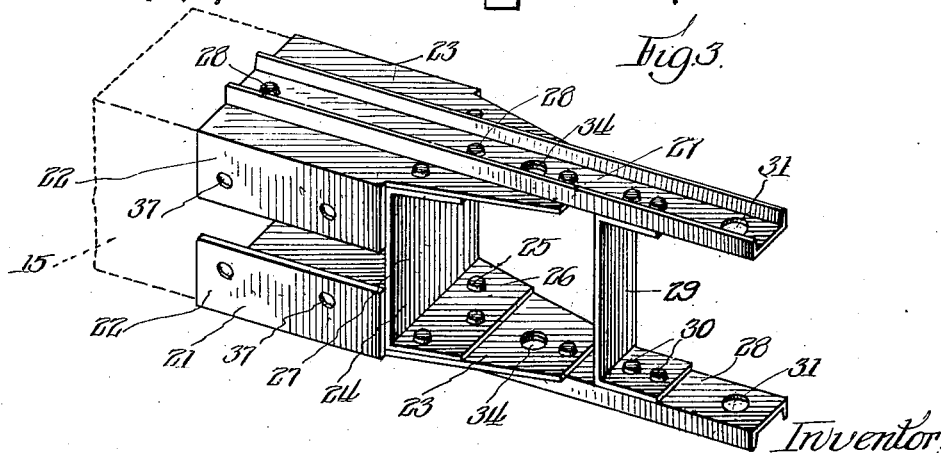
Inventor
Karl L. Rick,
By Wilkinson, Huxley, Byron & Knight
Attys Patented Jan. 5, 1932

1,839,594

REISSUED

UNITED STATES PATENT OFFICE

KARL L. RICK, OF CHICAGO, ILLINOIS

BRACKET

Application filed June 29, 1928. Serial No. 289,239.

The invention pertains to insulators and brackets for supporting the same and more particularly to bracket carrying insulators adapted for use with overhead power systems.

Heretofore it has been the practice to mount insulators upon a vertical pin screwed to or carried by a suitable buck arm or cross arm upon the upper end of a pole or support. However, this structure is not dependable, especially where employed at the dead end of a wire, for the reason that there is considerable pull in one direction only upon the pin, causing it to either snap, or split the cross arm and eventually become dismantled.

It is, therefore, an object of this invention to provide a structure which will eliminate the necessity for mounting an insulator pin upon a cross arm without further support.

Another object is to provide a construction whereby the insulator may be readily adapted to cross arms without the necessity of having to bore the latter to fit insulator pins therein.

Still another object is to provide a structure which is efficient, cheap to manufacture and maintain, can be built substantially of structural shapes and one which fulfills all requirements of service and manufacture.

With these and various other objects in view, the invention may consist of certain novel features of construction and operation, as will be more fully described and particularly pointed out in the specification, drawings and claims appended hereto.

In the drawings which illustrate an embodiment of the device, and wherein like reference characters are used to designate like parts—

Figure 1 is a fragmentary side elevation of the upper end of a pole or support showing the brackets as applied thereto and associated with an overhead power system;

Figure 2 is a top plan view of the structure illustrated in Figure 1; and

Figure 3 is an enlarged perspective view of the bracket device which is the subject matter of the invention.

In the construction illustrated the pole or support 10 has the side arm or support 11 secured thereto as by the nut and bolt connection 12, said side arm being provided with spaced insulators 13 carrying the phase conduits 14. The pole 10 is also provided with a buck arm 15 located at a convenient distance below the side arm and secured thereto by means of the bolt and nut connection 16 and the bracket 17 described and claimed in co-pending application, Serial No. 289,185, filed June 28, 1928, said bracket being secured to the side arm by means of the nut and bolt connections 18.

Brackets 19 which are the subject matter of this invention are shown as applied to both ends of the buck arm 15, said brackets being provided with suitable means, to be later described, for carrying the supply conduits 20 associated in the usual manner with the phase conduits 14.

Referring particularly to the bracket 19, the same may consist essentially of socket forming members 21 substantially channel shaped, disposed so that the flanges 22 toe toward each other, a portion of said flanges being cut away and the web 23 therebetween tapered, the said tapered portion forming a base for the attachment of the spacing channel 24 secured thereto as by rivets 25, the flanges 26 thereof toeing away from the socket and the web 27 thereof serving to complete the socket. The webs 23 of the members 21 have channel shaped members 27 secured thereto as by rivets 28, the flanges of said channel members toeing away from the channel members 21, said members being spaced apart by the channel support 29 secured thereto as by the rivets 30.

Aligned apertures 31 are provided in the web of the channel 27 to accommodate a supporting pin 32 securing the insulators 33 to the bracket structure. On the opposite side of the spacer 29 there are provided aligned apertures 34 disposed through the webs of the channel members 27 and 21, and provide a means for securing the supporting pin 35 thereto, said pin serving to secure the insulators 36 in operative position.

It will be understood that any number of rows of insulators may be provided, it being only necessary to provide an elongated member 27, each row being preferably separated by a brace 29.

It will be seen with the construction shown that structural shapes may be employed for the various parts, so that a very inexpensive yet effective construction may be had, and in the application of the device to the buck arm, it is only necessary to slip the socket portion on said buck arm, securing the same by any means, such as nut and bolt connections, disposed through aligned apertures 37 disposed in the flanges of the members 21, and through corresponding apertures in the buck arm.

It is to be understood that I do not wish to be limited by the exact embodiment of the device shown, which is merely by way of illustration and not limitation, as various and other forms of the device will, of course, be apparent to those skilled in the art, without departing from the spirit of the invention or the scope of the claims.

I claim:

1. In a bracket the combination of a socket forming portion adapted for engagement with a support, said socket forming portion including facing substantially channel shaped members and a channel shaped spacing member secured thereto, and spaced insulator carrying members, each being joined to one of said facing channel shaped members and being secured to said spacing channel shaped member, and spacing means secured to said insulator carrying members.

2. In a bracket the combination of a socket forming portion adapted for engagement with a support, said socket forming portion including facing substantially channel shaped members for the length of said socket, said members having a flat portion providing securing means for a channel shaped spacing member secured thereto to complete said socket portion and spaced insulator carrying members, each of said latter members being joined to one of said facing channel shaped members and being secured to said second named channel shaped member.

3. In a bracket the combination of a socket forming portion adapted for engagement with a support, said socket forming portion including facing substantially channel shaped members for the length of said socket, said members having a flat portion providing securing means for channel shaped spacing members secured thereto to complete said socket portion and spaced insulator carrying members, each of said latter members being joined to one of said facing channel shaped members and being secured to said spacing channel shaped member, said flat portions and said insulator carrying members having aligned apertures for insulator securing means.

4. In a bracket the combination of a socket forming portion adapted for engagement with a support, said socket forming portion including facing substantially channel shaped members for the length of said socket, said members having a flat portion providing securing means for a channel shaped spacing member secured thereto to complete said socket portion, and spaced channel shaped insulator carrying members, each being joined to one of said facing channel shaped members and being secured to said spacing channel shaped member, said flat portions and said insulator carrying members having aligned apertures for insulator securing means, and spacing means secured to said insulator carrying member between each insulator carried thereby.

Signed at Chicago, Illinois, this 27th day of June, 1928.

KARL L. RICK.